US012627041B2

(12) United States Patent
Ikeda et al.

(10) Patent No.: US 12,627,041 B2
(45) Date of Patent: May 12, 2026

(54) ANTENNA DEVICE

(71) Applicant: Mitsubishi Electric Corporation, Tokyo (JP)

(72) Inventors: Shunichi Ikeda, Tokyo (JP); Narihiro Nakamoto, Tokyo (JP); Hiromasa Nakajima, Tokyo (JP); Tomohiro Takahashi, Tokyo (JP); Toru Fukasawa, Tokyo (JP); Naoya Noguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 170 days.

(21) Appl. No.: 18/751,593

(22) Filed: Jun. 24, 2024

(65) Prior Publication Data

US 2024/0347924 A1 Oct. 17, 2024

Related U.S. Application Data

(63) Continuation of application No. PCT/JP2022/000635, filed on Jan. 12, 2022.

(51) Int. Cl.
*H01Q 1/52* (2006.01)
*H01Q 15/24* (2006.01)

(52) U.S. Cl.
CPC ............. *H01Q 1/526* (2013.01); *H01Q 1/525* (2013.01); *H01Q 15/242* (2013.01)

(58) Field of Classification Search
CPC ........ H01Q 1/525; H01Q 1/526; H01Q 15/24; H01Q 15/242
See application file for complete search history.

(56) References Cited

U.S. PATENT DOCUMENTS

2006/0097942 A1* 5/2006 Tanaka ............... H01Q 15/0006 343/756
2022/0173530 A1* 6/2022 Ueda ........................ H01Q 1/42
2022/0344827 A1* 10/2022 Pennock .............. H01Q 15/242

FOREIGN PATENT DOCUMENTS

JP 10-126146 A 5/1998

OTHER PUBLICATIONS

The International Search Report (PCT/ISA/210) issued in PCT/JP2022/000635, dated Mar. 8, 2022.

* cited by examiner

*Primary Examiner* — Daniel Munoz
(74) *Attorney, Agent, or Firm* — Birch, Stewart, Kolasch & Birch, LLP

(57) ABSTRACT

In a conventional antenna device, transmission radio waves transmitted from a transmitting antenna traveling directly to a receiving antenna are blocked by a shield wall disposed between the receiving antenna and the transmitting antenna. However, some of the transmission radio waves are diffracted at the edge of the shield wall and enter the receiving antenna as diffracted waves, affecting the reception of the reception radio waves. In view of this, the shield wall and a polarized wave converter unit are disposed between the transmitting antenna unit and the receiving antenna unit. As a result, vertically polarized wave components of the diffracted waves are converted by the polarized wave converter unit to circularly polarized wave components that are less affecting the reception of the reception radio waves in the receiving antenna, and the diffracted waves are prevented from affecting the receiving operation of the receiving antenna.

13 Claims, 9 Drawing Sheets

ANTENNA DEVICE

CROSS REFERENCE TO RELATED APPLICATIONS

This application is a Continuation of PCT International Application No. PCT/JP2022/000635, filed on Jan. 12, 2022, which is hereby expressly incorporated by reference into the present application.

TECHNICAL FIELD

The present disclosure relates to an antenna device.

BACKGROUND ART

In an antenna device with a transmitting antenna and a receiving antenna separately provided, the transmitting antenna and the receiving antenna are sometimes arranged close to each other from a viewpoint of limitation of installation space, downsizing of the device, and the like. When such an antenna device is used in a time-division duplex system, in which transmission of transmission radio waves and reception of reception radio waves are performed in a time-division manner, isolation between the transmission radio waves and the reception radio waves is ensured. However, when the antenna device is used, for example, in a frequency-division duplex system, in which the transmission of the transmission radio waves and the reception of the reception radio waves may be performed simultaneously, the transmission radio waves may interfere with the reception radio waves or become a disturbance to the receiving antenna for receiving radio waves. This may degrade the performance of the antenna device.

As an example of preventing the transmission radio waves from affecting the reception radio waves when the transmitting antenna and the receiving antenna are placed close to each other, Patent Document 1 discloses an antenna device in which the transmission radio waves traveling from the transmitting antenna to the receiving antenna are blocked and prevented from affecting the reception radio waves by providing a shield wall composed of a metal or a wave absorber between the transmitting antenna and the receiving antenna.

PRIOR ART DOCUMENTS

Patent Documents

[Patent Document 1] Japanese Unexamined Patent Application Publication No. H10-126146

SUMMARY OF THE INVENTION

Problems to be Solved by the Invention

In the antenna device disclosed in the above Patent Document 1, the shield wall disposed between the receiving antenna and the transmitting antenna can block the transmission radio waves that travel directly from the transmitting antenna to the receiving antenna. However, there remains a problem that some of the transmission radio waves are diffracted at the edge of the shield wall, and enter the receiving antenna as diffracted waves, thereby affecting a receiving operation of the reception radio waves.

The present disclosure is made to solve the above-mentioned problem and aims at obtaining an antenna device capable of suppressing adverse effects on the reception of the reception radio waves by the receiving antenna, the adverse effects being caused by the diffracted waves which are generated by the diffraction of the transmission radio waves radiated from the transmitting antenna at the edge of the shield wall disposed between the receiving antenna and the transmitting antenna.

Means for Solving Problem

An antenna device according to the present disclosure includes: a transmitting antenna unit to transmit transmission radio waves of circular polarization; a receiving antenna unit to receive reception radio waves of circular polarization; a shield wall disposed between the transmitting antenna unit and the receiving antenna unit to block the transmission radio waves transmitted from the transmitting antenna unit toward the receiving antenna unit; and a polarized wave converter unit disposed between the shield wall and the receiving antenna unit to convert vertically polarized wave components of the transmission radio waves into circularly polarized wave components having a rotation direction different from that of the reception radio waves to be received by the receiving antenna unit.

The antenna device according to the present disclosure includes: a transmitting antenna unit to transmit transmission radio waves of circular polarization; a receiving antenna unit to receive reception radio waves of circular polarization; a shield wall disposed between the transmitting antenna unit and the receiving antenna unit to block the transmission radio waves transmitted from the transmitting antenna unit toward the receiving antenna unit; and a polarized wave converter unit disposed between the transmitting antenna unit and the shield wall to convert circularly polarized waves of the transmission radio waves into horizontally polarized waves having a polarized wave plane parallel to the shield wall.

Effects of the Invention

The antenna device according to the present disclosure includes the polarized wave converter unit disposed between the shield wall and the receiving antenna unit to convert the vertically polarized wave components of the transmission radio waves to the circularly polarized wave components that have a rotation direction different from that of the reception radio waves to be received by the receiving antenna. The polarized wave converter unit converts the vertically polarized wave components of the diffracted waves to the circularly polarized wave components that are less affecting the reception of the reception radio waves by the receiving antenna even when the diffracted waves generated by the diffraction of the transmission radio waves at an upper edge of the shield wall travel to the receiving antenna unit. As a result, the adverse effects caused by the diffracted waves on the receiving operation of the receiving antenna is suppressed, and the performance degradation of the antenna device can be suppressed.

Also, the antenna device according to the present disclosure includes the polarized wave converter unit disposed between the transmitting antenna unit and the shield wall to convert the circularly polarized waves of the transmission radio waves to the horizontally polarized waves having the polarized wave plane parallel to the shield wall. Therefore, the horizontally polarized waves generated by the conversion of the circularly polarized waves of the transmission radio waves by the polarized wave converter unit is attenuated by the shield wall. This suppresses the diffracted waves due to the transmission radio waves from occurring at the upper edge of the shield wall and prevents the transmission radio waves from entering the receiving antenna unit. Therefore, the adverse effects caused by the transmission radio waves on the receiving operation of the receiving antenna can be suppressed, and the performance degradation of the antenna device can be suppressed.

EMBODIMENTS FOR CARRYING OUT THE INVENTION

Embodiment 1

Figure 1:
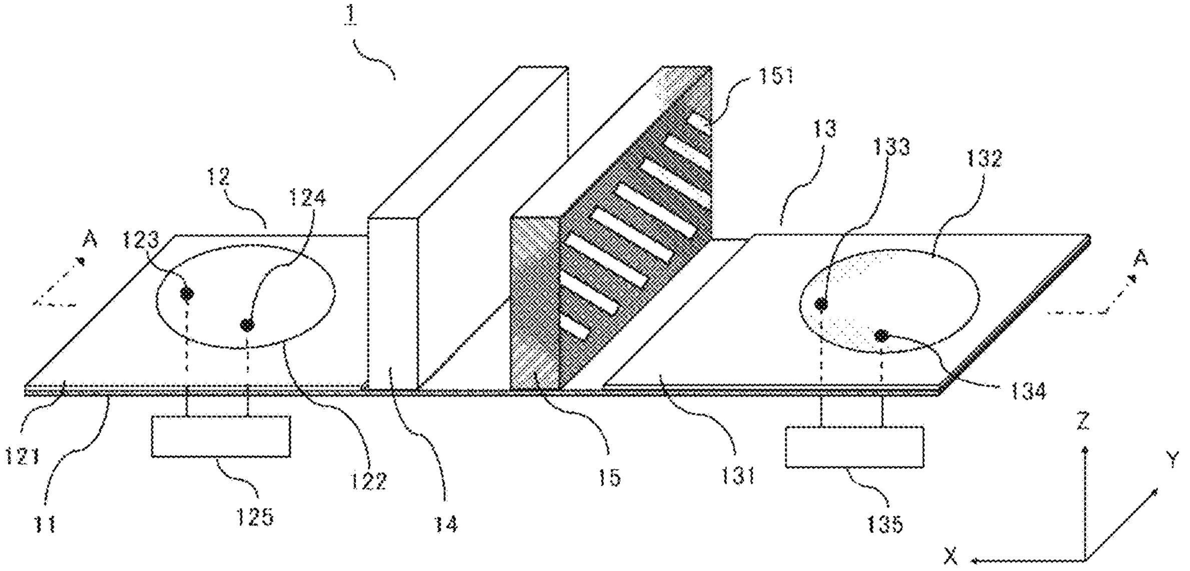
FIG. 1 is a configuration diagram of an antenna device according to Embodiment 1.
Figure 2:
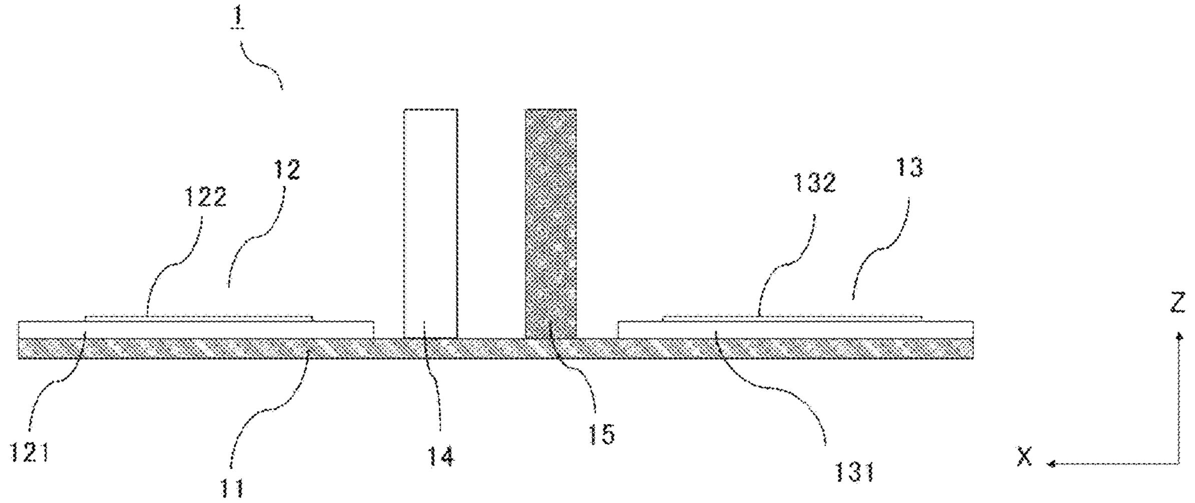
FIG. 2 is a cross-sectional view of the antenna device according to Embodiment 1.

FIG. 1 is a configuration diagram of an antenna device 1 according to Embodiment 1, and FIG. 2 is a cross-sectional view along the A-A cross-section of the antenna device 1 in FIG. 1. The antenna device 1 includes a transmitting antenna unit 12, a receiving antenna unit 13, and a shield wall 14. The transmitting antenna unit 12 is disposed on a base plate 11 and transmits transmission radio waves of circular polarization. The receiving antenna unit 13 is disposed on the base plate 11 close to the transmitting antenna unit 12 and receives reception radio waves of circular polarization. The shield wall 14 is disposed on a surface of the base plate 11 between the transmitting antenna unit 12 and the receiving antenna unit 13 and blocks, among the transmission radio waves radiated from the transmitting antenna unit 12, direct waves traveling directly toward the receiving antenna unit 13.

In addition, the antenna device 1 includes a polarized wave conversion plate 15 as a polarized wave converter unit. The polarized wave conversion plate 15 is disposed on the surface of the base plate 11 between the shield wall 14 and the receiving antenna unit 13 and converts vertically polarized wave components in the transmission radio waves transmitted from the transmitting antenna unit 12 to circularly polarized waves having a rotation direction different from that of the reception radio waves to be received by the receiving antenna unit 13 (hereinafter, this different rotation direction is referred to as a reverse rotation direction).

The transmitting antenna unit 12 includes the base plate 11, a dielectric substrate 121, a patch conductor 122, a vertically polarized wave transmission feeding point 123, a horizontally polarized wave transmission feeding point 124, a transmitter unit 125, and a grounded conductor layer (not shown). The base plate 11 is a conductor. The dielectric substrate 121 is disposed on the surface of the base plate 11. The patch conductor 122 is an antenna element formed on the dielectric substrate 121. The vertically polarized wave transmission feeding point 123 and the horizontally polarized wave transmission feeding point 124 feed power to the patch conductor 122. The transmitter unit 125 connects with the vertically polarized wave transmission feeding point 123 and the horizontally polarized wave transmission feeding point 124. The grounded conductor layer (not shown) is formed on the backside of the base plate 11 and is in contact with and electrically connected to the base plate 11.

The receiving antenna unit 13, as with the transmitting antenna unit 12, includes the base plate 11, a dielectric substrate 131, a patch conductor 132, a vertically polarized wave reception feeding point 133 and a horizontally polarized wave reception feeding point 134 for feeding power from the patch conductor 132, a receiver unit 135 connecting with the vertically polarized wave reception feeding point 133 and the horizontally polarized wave reception feeding point 134, and the grounded conductor layer.

In both of the transmitting antenna unit 12 and the receiving antenna unit 13, their respective antenna elements are fed from two ports with a 90-degree phase difference between them in order to produce the circularly polarized waves. The transmitted circularly polarized waves and the received circularly polarized waves may use a frequency band from a few GHz to a few tens of GHz (such as X-band, Ku-band, Ka-band). The transmitter unit 125 is disposed on the side of the base plate 11 corresponding to the back of the transmitting antenna unit 12. The receiver unit 135 is disposed on the side of the base plate corresponding to the back of the receiving antenna unit 13.

The shield wall 14, which is formed of a conductor, may be attached to the base plate 11 in such a manner that it is electrically connected to the base plate 11, or it may be formed integrally with the base plate 11. The shield wall 14 is disposed upright on the base plate 11 so as to separate the receiving antenna unit 13 from the space to which the transmission radio waves transmitted from the transmitting antenna unit 12 are radiated, and is projecting in the Z-axis direction in FIG. 1. The shield wall 14 blocks, among the transmission radio waves radiated from the transmitting antenna unit 12, the direct waves traveling directly toward the receiving antenna unit 13.

The polarized wave conversion plate 15 converts linearly polarized wave components in the transmission radio waves transmitted from the transmitting antenna unit 12 to the circularly polarized waves in reverse rotation to the reception radio waves of circular polarization received by the receiving antenna unit 13. The polarized wave conversion plate 15, located between the upper edge of the shield wall 14 and the receiving antenna unit 13, includes a printed circuit board disposed upright in the Z-axis direction, and has a conductor pattern 151 formed by etching on the side facing the receiving antenna unit 13. As shown in FIG. 1, the conductor pattern 151 is formed as a grid line polarizer on which linear conductor patterns are regularly arranged.

Figure 3:
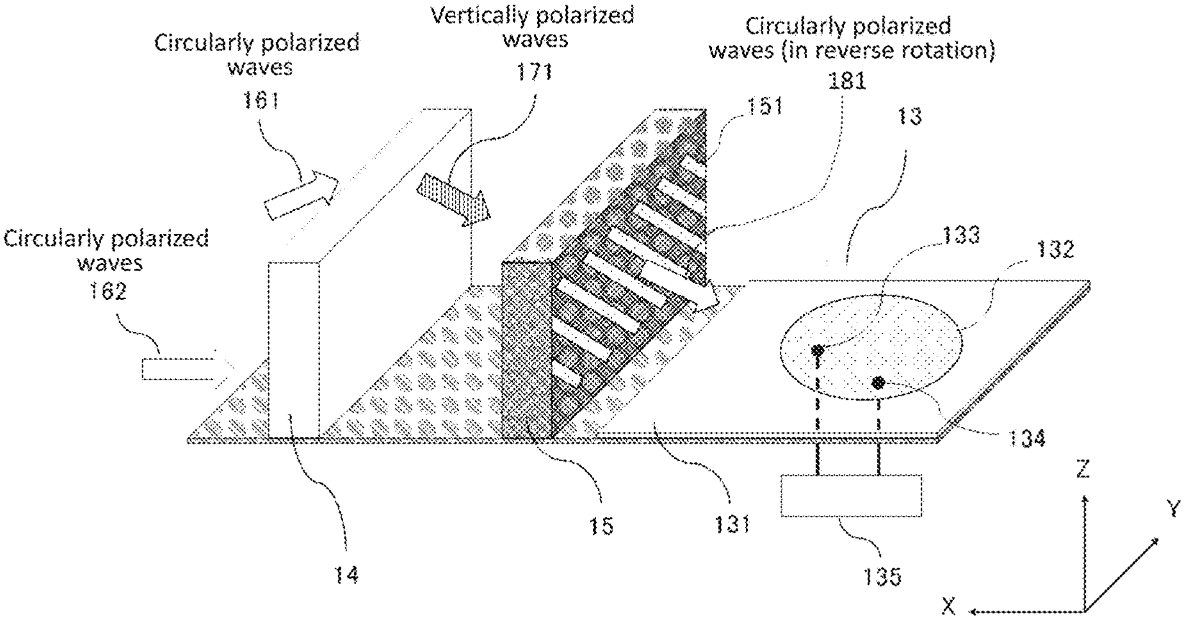
FIG. 3 is a schematic view schematically illustrating an operation of an antenna device 1 according to Embodiment 1.

Next, an operation of the antenna device 1 configured as described above in Embodiment 1 will be described. FIG. 3 is a schematic view schematically illustrating an operation of the antenna device 1.

The transmission radio waves of circular polarization transmitted from the transmitting antenna unit 12 radiate above the transmitting antenna unit 12, but some of circularly polarized waves 162 also radiate toward the direction of the receiving antenna unit 13. If the transmission radio waves enter the receiving antenna unit 13, they affect the reception of the reception radio waves, but the circularly polarized waves 162 radiated toward the receiving antenna unit 13 are blocked by the shield wall 14 and do not enter the receiving antenna unit 13. Therefore, even when the antenna device 1 is used in a frequency division duplex system, it is possible to prevent the degradation of the reception performance caused by the transmission radio waves directly affecting the reception radio waves.

Some of circularly polarized waves 161 of the transmission radio waves transmitted from the transmitting antenna unit 12 are diffracted at the upper edge of the shield wall 14 to become diffracted waves of vertically polarized waves, and some of vertically polarized waves 171 travel to the receiving antenna unit 13. If the vertically polarized waves 171 enter the receiving antenna unit 13 as they are, they affect the reception of the reception radio waves in the receiving antenna unit 13. However, in the antenna device 1 according to the present embodiment, the vertically polarized waves 171 traveling from the upper edge of the shield wall 14 to the receiving antenna unit 13 are converted by the polarized wave conversion plate 15 to circularly polarized waves 181 that are in reverse rotation to the reception radio waves to be received by the receiving antenna unit 13 and, as a result, are difficult for the receiving antenna unit 13 to receive. Therefore, the adverse effects caused by the vertically polarized waves 171 on the reception radio waves to be received by the receiving antenna unit 13 is suppressed.

The operation will be described in more detail. The wrap-around case of the polarized wave components of the radio waves at the upper edge of a conductor, such as the shield wall 14, varies depending on an angle at which the radio waves are incident on a diffraction point. Of the circularly polarized waves 161 radiated from the transmitting antenna unit 12 toward the shield wall 14, for the components parallel to the surface of the shield wall 14, that is, horizontally polarized wave components, an electric field plane becomes parallel to the surface of the shield wall 14. Therefore, electric field components are attenuated when a current caused by the electric field components of the horizontally polarized waves flows on the surface of the shield wall 14. On the other hand, of the circularly polarized waves 161 radiated from the transmitting antenna unit 12 toward the shield wall 14, for the vertically polarized wave components orthogonal to the horizontally polarized wave components, the electric field components are less attenuated than those of the horizontally polarized wave components. Therefore, in the polarized wave components of the radio waves wrapping around at the upper edge of the shield wall 14, that is, the diffracted waves, the vertically polarized wave components become dominant. Thus, the diffracted waves generated when the transmission radio waves of circular polarization are diffracted at the upper edge of the shield wall 14 become the radio waves that are vertically polarized.

Among the diffracted waves of the vertically polarized waves generated by the diffraction at the upper edge of the shield wall 14, the vertically polarized waves 171 traveling to the receiving antenna unit 13 are incident on the polarized wave conversion plate 15 located between the upper edge of the shield wall 14 and the receiving antenna unit 13.

The polarized wave conversion plate 15 changes the polarized wave components of incident radio waves, and how they are changed depends on an orientation of an incident electric field with respect to the conductor pattern 151.

When the grid line polarizer shown in FIG. 1 is used as the polarized wave conversion plate 15, inductance is generated when an electric field is incident in the direction parallel to grid lines, and capacitance is generated when the electric field is incident in the direction perpendicular to the grid lines. Magnitudes of the inductance and the capacitance are determined from a thickness of a substrate of the polarized wave conversion plate 15, line widths and line intervals of the conductor pattern 151, and the like. Therefore, by arranging the grid lines obliquely with respect to a polarization direction of incident diffracted waves, a phase advance or delay can be given to the electric field components that are perpendicular or horizontal to the grid lines. On the basis of such an action, the polarized wave conversion plate 15 is configured in such a manner that incident vertically polarized waves are converted to the circularly polarized waves that are in reverse rotation with respect to the reception radio waves to be received by the receiving antenna unit 13. With this configuration, when the vertically polarized waves 171 traveling from the upper edge of the shield wall 14 to the receiving antenna unit 13 are incident on the polarized wave conversion plate 15, they are converted to the circularly polarized waves 181 that are in reverse rotation with respect to the reception radio waves to be received by the receiving antenna unit 13.

For receiving the reception radio waves of circular polarization, the receiving antenna unit 13 includes the vertically polarized wave reception feeding point 133 and the horizontally polarized wave reception feeding point 134. Signals corresponding to the received radio waves can be obtained by synthesizing the signals obtained at these power feeding points in the receiver unit 135 having a synthesis circuit. When the reception radio waves of circular polarization having a rotation direction to be received by the receiving antenna unit 13 enter the receiving antenna unit 13, the desired signal can be obtained as described above. On the other hand, when the circularly polarized waves 181 that are in reverse rotation to the reception radio waves enter the receiving antenna unit 13, the vertically polarized wave components and the horizontally polarized wave components of the diffracted waves are offset in the receiver unit 135 because the signals fed at the vertically polarized wave reception feeding point 133 and the signals fed at the horizontally polarized wave reception feeding point 134 have the same amplitude and opposite phases. Therefore, in the receiver unit 135, the signals resulting from the circularly polarized waves 181 of the diffracted waves are absent or negligible compared to the signals corresponding to the reception radio waves. Thus, even when the diffracted waves generated from the transmission radio waves diffracted at the upper edge of the shield wall 14 travel to the receiving antenna unit 13, the diffracted waves are suppressed from affecting the receiving operation of the reception radio waves.

As described above, the antenna device 1 according to Embodiment 1 includes the polarized wave conversion plate 15 as a polarized wave converter unit between the transmitting antenna unit 12 and the receiving antenna unit 13, specifically between the upper edge of the shield wall 14 and the receiving antenna unit 13. Thus, in the case where the shield wall 14 is provided to block the transmission radio waves transmitted from the transmitting antenna unit 12 toward the receiving antenna unit 13, even when the diffracted waves generated at the upper edge of the shield wall 14 travel to the receiving antenna unit 13, the diffracted waves can be suppressed from affecting the reception of the reception radio waves in the receiving antenna; the isolation between the transmitting antenna unit 12 and the receiving antenna unit 13 can be improved; and the performance degradation of the antenna device 1 can be suppressed, because the vertically polarized waves of the diffracted waves are converted by the polarized wave conversion plate 15 to the circularly polarized waves that are in reverse rotation to the reception radio waves to be received by the receiving antenna unit 13, in other words, to the circularly polarized waves that are less affecting the reception of the reception radio waves in the receiving antenna unit 13.

Embodiment 2

In Embodiment 1, a configuration is described, in which, in an area between the transmitting antenna unit 12 and the receiving antenna unit 13, the shield wall 14 is disposed on the side of the transmitting antenna unit 12, and the polarized wave conversion plate 15 is disposed on the side of the receiving antenna unit 13. Due to the reversibility of transmission and reception in an antenna device, the same effect can be obtained even if positions of the shield wall 14 and the polarized wave conversion plate 15 are reversed. In Embodiment 2, a configuration of an antenna device 1 will be described, in which, in an area between the transmitting antenna unit 12 and the receiving antenna unit 13, the polarized wave conversion plate 15 is disposed on the side of the transmitting antenna unit 12, and the shield wall 14 is disposed on the side of the receiving antenna unit 13.

Figure 4:
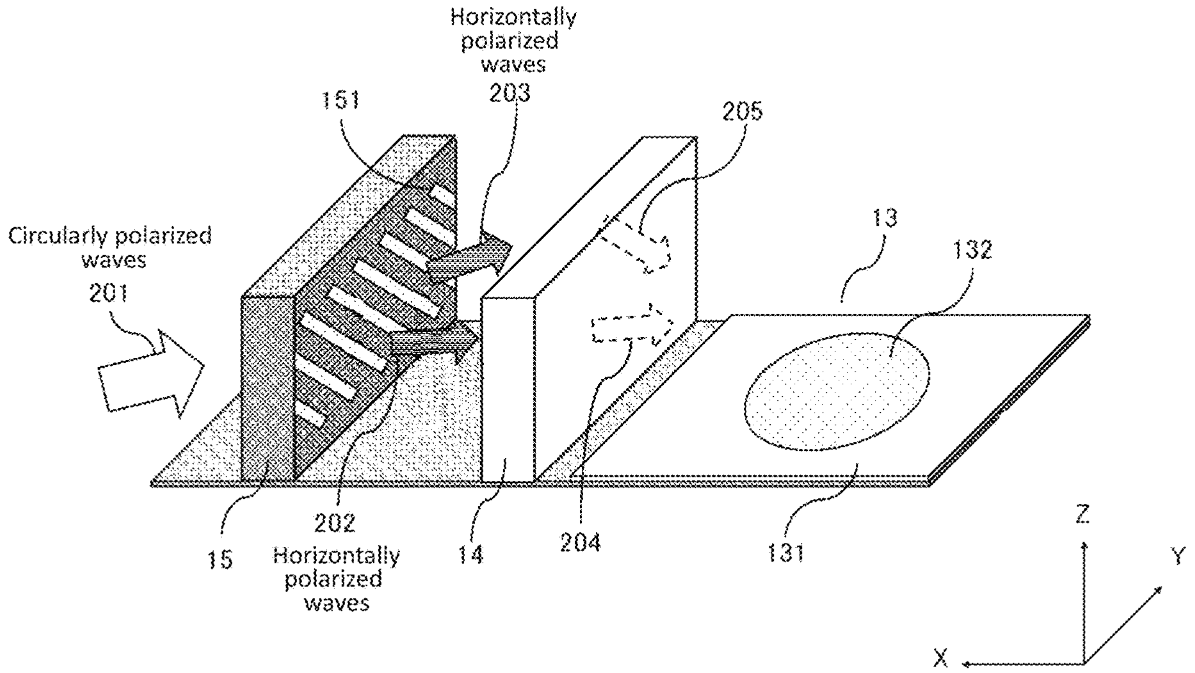
FIG. 4 is a schematic view schematically illustrating an operation of an antenna device 1 according to Embodiment 2.

FIG. 4 is a schematic view schematically illustrating a configuration and an operation of the antenna device 1 according to Embodiment 2. Embodiment 2 is similar to Embodiment 1 in that the shield wall 14 and the polarized wave conversion plate 15 are disposed between the transmitting antenna unit 12 and the receiving antenna unit 13. However, in Embodiment 2, the shield wall 14 is disposed on the side of the transmitting antenna unit 12 and the polarized wave conversion plate 15 is disposed on the side of the receiving antenna unit 13. That is, the polarized wave conversion plate 15 is disposed between the transmitting antenna unit 12 and the shield wall 14. Also, the polarized wave conversion plate 15 includes the grid line polarizer as used in the polarized wave conversion plate 15 shown in Embodiment 1, and is configured to convert circularly polarized waves 201 of the transmission radio waves to horizontally polarized waves 202, horizontally polarized waves 203, and the like having a polarized wave plane parallel to the shield wall 14. In the antenna device 1 according to Embodiment 2, the configurations other than the shield wall 14 and the polarized wave conversion plate 15 have the same configurations as those in Embodiment 1.

Next, an operation of the antenna device configured as described above will be described.

First, the direct waves transmitted from the transmitting antenna unit 12 toward the direction entering the receiving antenna unit 13 are blocked by the shield wall 14 in the same manner as in Embodiment 1, and therefore do not enter the receiving antenna unit 13.

Among the circularly polarized waves radiated from the transmitting antenna unit 12 toward the receiving antenna unit 13, the circularly polarized waves 201 reaching the polarized wave conversion plate 15 are converted by the polarized wave conversion plate 15 to the horizontally polarized waves having a polarized wave plane parallel with respect to the shield wall 14, and the horizontally polarized waves 202, the horizontally polarized waves 203, and the like traveling toward the receiving antenna unit 13 reach the shield wall 14. Electric field planes of the horizontally polarized waves 202 and 203 are parallel to the surface of the shield wall 14 so that, when the current caused by the electric field components of the horizontally polarized waves 202 and 203 reaching the shield wall 14 flows on the surface of the shield wall 14, these electric field components are attenuated. Therefore, as indicated by the dotted line arrows in FIG. 4, horizontally polarized waves 204 passing through the shield wall 14 15 do not occur, and the horizontally polarized waves 203 traveling to the upper edge of the shield wall 14 are also attenuated by the shield wall 14. Thus, the generation of diffracted waves 205 caused by the transmission radio waves at the upper edge of the shield wall 14 is suppressed, and as a result, the transmission radio waves can be prevented from entering the receiving antenna unit 13.

As described above, the antenna device 1 according to Embodiment 2 includes the shield wall disposed between the transmitting antenna unit and the receiving antenna unit, and the polarized wave conversion plate 15 disposed between the transmitting antenna unit and the shield wall to convert the circularly polarized waves of the transmission radio waves to the horizontally polarized waves having a polarized wave plane parallel to the shielding wall 14. As a result, the horizontally polarized waves caused by the circularly polarized waves of the transmission radio waves being converted by the polarized wave conversion plate 15 are attenuated at the shield wall 14. Thus, the diffracted waves caused by the transmission radio waves are suppressed from occurring at the upper edge of the shield wall 14, and the transmission radio waves are prevented from entering the receiving antenna unit 13. Thus, the transmission radio waves are suppressed from affecting the receiving operation of the receiving antenna unit 13, and the performance degradation of the antenna device 1 can be suppressed.

Embodiment 3

Figure 5:
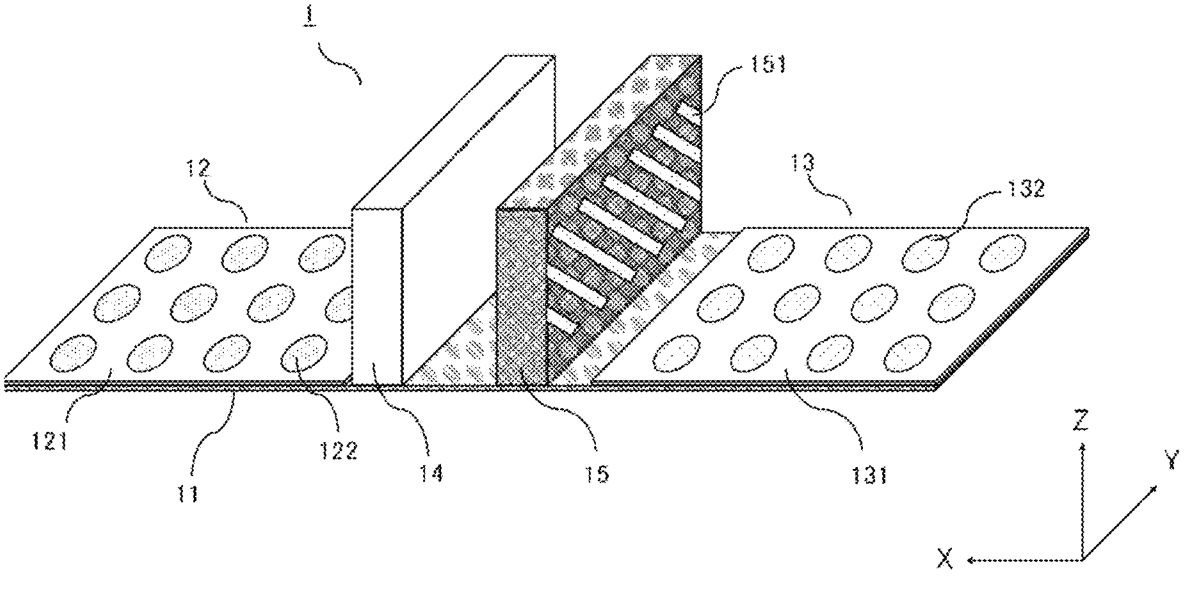
FIG. 5 is a configuration diagram of an antenna device according to Embodiment 3.

Next, an antenna device 1 according to Embodiment 3 will be described. FIG. 5 is a configuration diagram of the antenna device 1 according to Embodiment 3.

The transmitting antenna unit 12 and the receiving antenna unit 13 in the antenna device 1 according to Embodiment 1 each have one patch conductor as the antenna element. The antenna device 1 according to Embodiment 3 is different from the antenna device in Embodiment 1 in that the transmitting antenna unit 12 includes a plurality of patch conductors 122 as the antenna elements, and the receiving antenna unit 13 includes a plurality of patch conductors 132 as the antenna elements. The rest of the configuration is the same as in Embodiment 1.

Next, an operation of the antenna device 1 according to Embodiment 3 will be described.

Some of the transmission radio waves transmitted from the transmitting antenna unit 12 are diffracted at the upper edge of the shield wall 14 to become the diffracted waves, and some of them travel to the receiving antenna unit 13. If the diffracted waves traveling to the receiving antenna unit 13 enter the receiving antenna unit 13 as they are, the reception radio waves to be received by the receiving antenna unit 13 are affected. In Embodiment 1, the diffracted waves due to the transmission radio waves radiated from the one patch conductor 122 are converted by the polarized wave conversion plate 15 to the circularly polarized waves 181 in reverse rotation to the reception radio waves to be received by the receiving antenna unit 13. In Embodiment 3, the plurality of patch conductors 122 formed in the transmitting antenna unit 12 radiates the transmission radio waves, and incident angles of the respective transmission radio waves to the edge of the shield wall 14 are different. Therefore, it is difficult to convert, by using one type of the polarized wave conversion plate 15, all of the diffracted waves due to these transmission radio waves to the circularly polarized waves 181 completely in reverse rotation to all of the respective reception radio waves to be received by the patch conductors 132 of the receiving antenna unit 13. Therefore, the thickness of the substrate of the polarized wave conversion plate 15, the line widths and the line intervals and the like of the conductor pattern 151 are adjusted so that the amount of radio waves that the diffracted waves enter each of the patch conductors 132 of the receiving antenna unit 13 (hereinafter, referred to as binding amount) is below a target value. For example, the following objective function is set up and the adjustment is performed so that Ssum is below a target improvement value.

$$S_{sum} = \sum_{n}^{N}\sum_{m}^{M} S_{nm} \quad \text{[Expression 1]}$$

Here, M is the number of elements in the transmitting antenna; N is the number of elements in the receiving antenna; m is the reference number of an element in the transmitting antenna (m=1 to M); and n is the reference number of an element in the receiving antenna (n=1 to N). Snm is the binding amount of the polarized waves from the m-th patch conductor 122 in the transmitting antenna unit 12 to the n-th patch conductor 132 in the receiving antenna unit after polarization synthesis. Thus, Ssum is the sum of the binding amounts from each of the patch conductors 122 to each of the patch conductors 132. The amount of the radio waves that the diffracted waves leak into each of the patch conductors 132 of the receiving antenna unit 13 can be controlled to a desired value by adjusting dimensional values of the polarized wave conversion plate 15 so that the sum of the binding amounts (Ssum) is below the target improvement value (Sdesired), in other words, Ssum<Sdesired is satisfied.

As described above, in the antenna device 1 according to Embodiment 3, in which the transmitting antenna unit 12 and the receiving antenna unit 13 include the plurality of patch conductors 122 and 132, respectively, the adverse effects caused by the diffracted waves on the reception radio waves to be received by the receiving antenna unit 13 is suppressed within a predetermined range, the isolation between the transmitting antenna unit 12 and the receiving antenna unit 13 can be improved, and the performance degradation of the antenna device 1 can be suppressed, by adjusting the dimensional values of the polarized wave conversion plate 15 so that the amount of the radio waves that the plurality of diffracted waves leak into each of the patch conductors 132 in the receiving antenna unit 13 is below the target value.

Note that, in the case where the polarized wave conversion plate 15 is disposed between the shield wall 14 and the transmitting antenna unit 12 as in Embodiment 2, when the transmitting antenna unit 12 includes the plurality of patch conductors as the antenna elements and the receiving antenna unit 13 includes the plurality of patch conductors as the antenna elements as in Embodiment 3, similarly, the adverse effects caused by the diffracted waves on the reception radio waves to be received by the receiving antenna unit 13 is suppressed within a predetermined range, the isolation between the transmitting antenna unit 12 and the receiving antenna unit 13 can be improved, and the performance degradation of the antenna device 1 can be suppressed.

Embodiment 4

Figure 6:
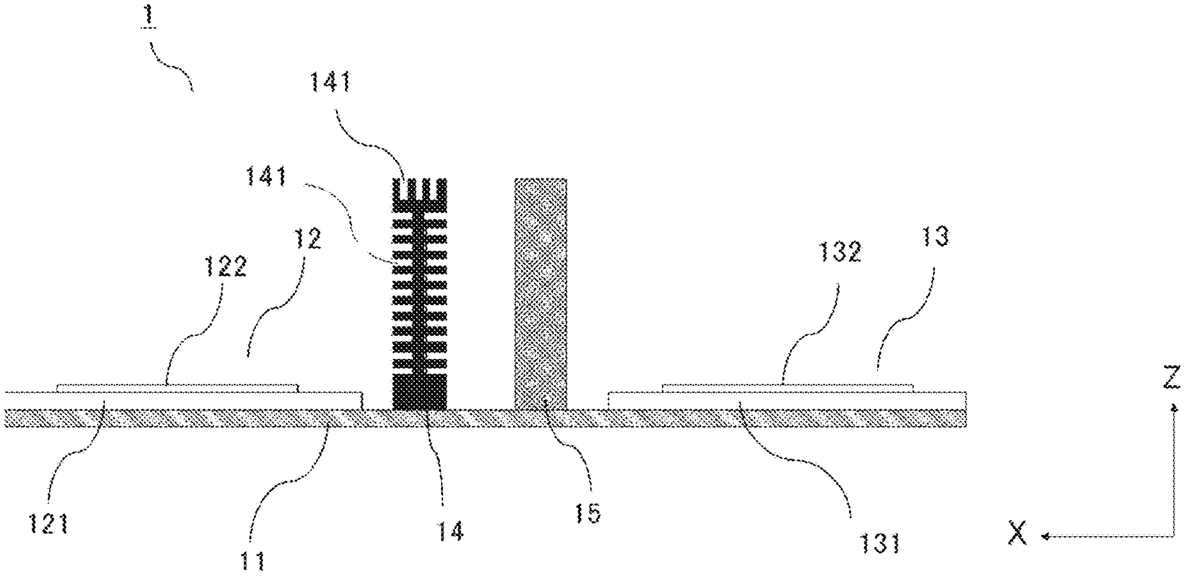
FIG. 6 is a cross-sectional view of an antenna device according to Embodiment 4.
Figure 7:
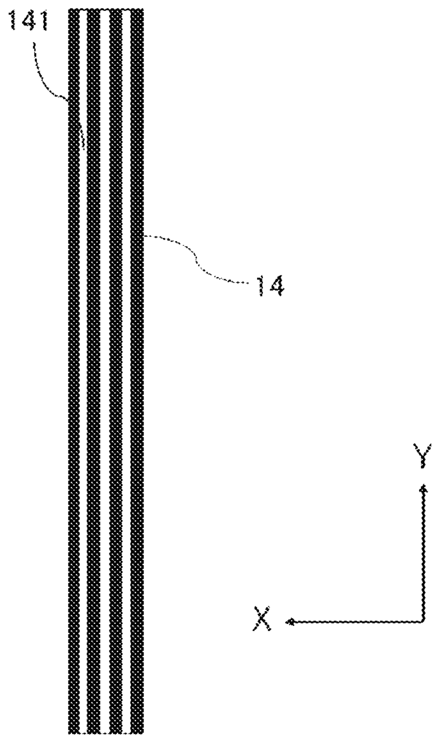
FIG. 7 is a top view of a shield wall according to Embodiment 4.

Next, an antenna device 1 according to Embodiment 4 will be described. FIG. 6 is a side view showing a structure of the antenna device 1 according to Embodiment 4, and FIG. 7 is a top view of a shield wall 14 of the antenna device 1 according to Embodiment 4. Embodiment 4 is different from Embodiment 1 in that the shield wall 14 includes a plurality of choke grooves 141 on the surface, and the other configurations are the same as those in Embodiment 1. The choke grooves 141 are grooves each extending on the surface of the shield wall 14 in the direction orthogonal to the direction in which the transmitting antenna unit 12 and the receiving antenna unit 13 are arranged, having a depth corresponding to ¼ of the wavelength of the transmission radio waves, and being arranged along the Y-axis direction.

Next, an operation of the antenna device 1 according to Embodiment 4 will be described. Some of the transmission radio waves transmitted from the transmitting antenna unit 12 reach the shield wall 14. The transmission radio waves that enter the choke grooves 141 are reflected at the bottoms of the choke grooves 141 to obtain a delay of ½ wavelength when exiting the choke grooves 141. That is, the phase of the radio waves that pass through the choke grooves 141, which are reversed by 180 degrees, and the phase of the transmission radio waves that do not pass through the choke grooves 141 are in phase opposition and cancel each other out. Thus, the power of the transmission radio waves incident on the shield wall 14 is reduced. Similarly, the power of the transmission radio waves diffracted at the upper edge of the shield wall 14 is reduced by the action of the choke grooves 141 disposed on the upper surface of the shield wall 14. The diffracted waves, with such reduced power, traveling toward the receiving antenna unit 13 are converted by the polarized wave conversion plate 15 to the circularly polarized wave components that are in reverse rotation.

As described above, the antenna device 1 according to Embodiment 4 includes the plurality of choke grooves 141 each having a depth corresponding to ¼ of the wavelength of the diffracted waves on the shield wall 14, and the polarized wave conversion plate 15. Therefore, the power of the diffracted waves to be converted by the polarized wave conversion plate 15 to the circularly polarized wave components that are in reverse rotation is further reduced than in Embodiment 1. As a result, the isolation between the transmitting antenna unit 12 and the receiving antenna unit 13 can be improved, and the performance degradation of the antenna device 1 can be suppressed.

Embodiment 5

Figure 8:
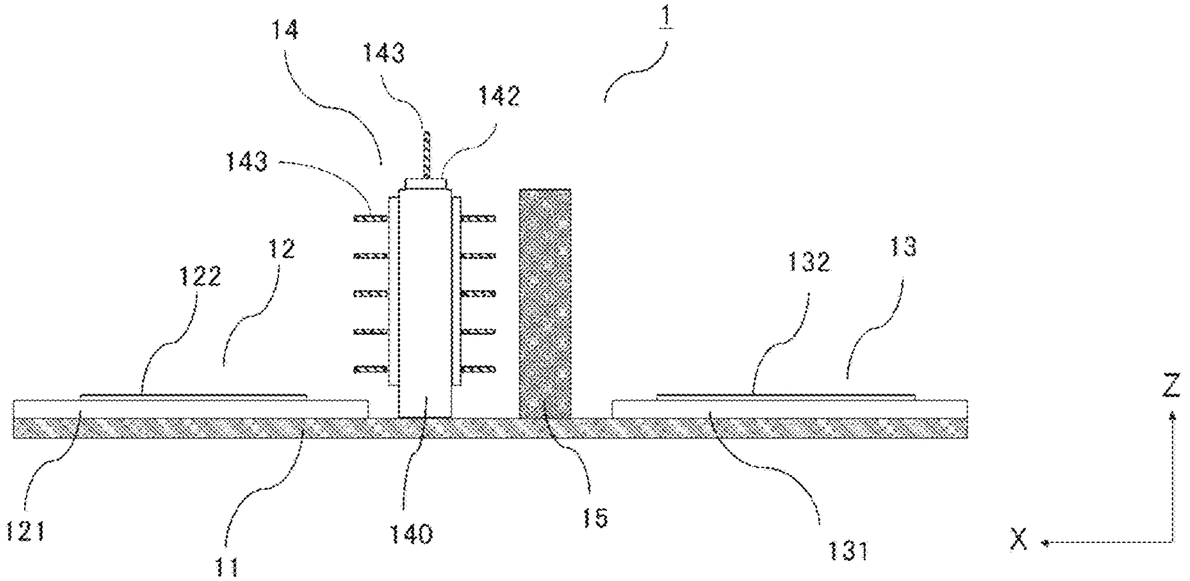
FIG. 8 is a configuration diagram of an antenna device according to Embodiment 5.
Figure 9:
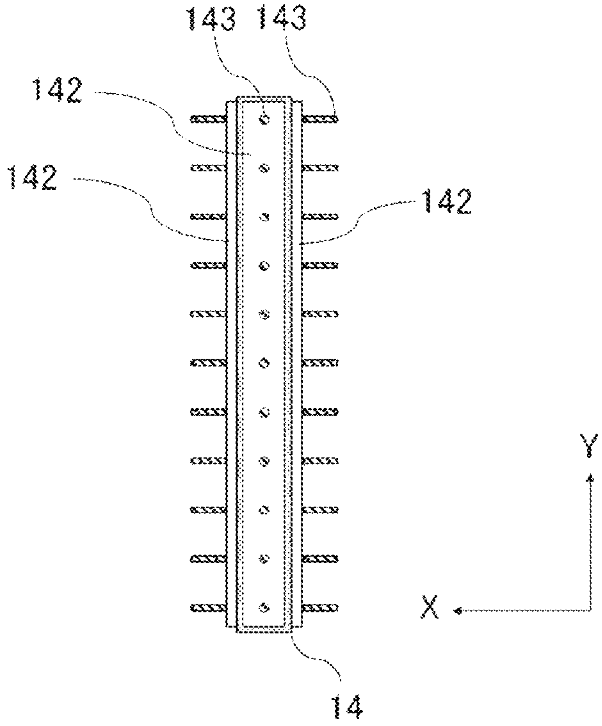
FIG. 9 is a cross-sectional view of the antenna device according to Embodiment 5.

Next, a configuration of an antenna device 1 according to Embodiment 5 will be described. FIG. 8 is a side view showing a structure of the antenna device 1 according to Embodiment 5, and FIG. 9 is a top view of a shield wall 14 of the antenna device 1 according to Embodiment 5. Embodiment 5 is different from Embodiment 1 in that the shield wall 14 includes a shield wall substrate 140, a plurality of dielectric substrates 142 disposed on the surfaces of the shield wall substrate 140 and extending in the Y-axis direction, and a plurality of antenna elements 143 supported by the dielectric substrates 142, and the other configurations are the same as those in Embodiment 1.

The antenna elements 143 are made of a monopole antenna element, for example, but may be made of a dipole antenna element, a patch antenna element, or a combination thereof instead of the monopole antenna element. The antenna elements 143 are each connected to a termination circuit (not shown).

Next, an operation of the antenna device 1 according to Embodiment 5 will be described. In the antenna device 1, some of the transmission radio waves transmitted from the transmitting antenna unit 12 reach the shield wall 14 to be absorbed by the antenna elements 143. Therefore, the transmission radio waves diffracted at the upper edge of the shield wall 14 are also absorbed by the antenna elements 143 disposed on the upper surface of the shield wall 14 to reduce their power. The diffracted waves, with such reduced power, traveling toward the receiving antenna unit 13 are converted by the polarized wave conversion plate 15 to the circularly polarized wave components that are in reverse rotation.

As described above, the antenna device 1 according to Embodiment 5 includes the plurality of dielectric substrates 142 and the plurality of antenna elements 143 on the shield wall 14. Therefore, the power of the diffracted waves to be converted by the polarized wave conversion plate 15 to the circularly polarized wave components that are in reverse rotation is further reduced than in Embodiment 1. As a result, the isolation between the transmitting antenna unit 12 and the receiving antenna unit 13 can be improved, and the performance degradation of the antenna device 1 can be suppressed.

Note that, in the case where the polarized wave conversion plate 15 is disposed between the shield wall 14 and the transmitting antenna unit 12 as in Embodiment 2, the shield wall 14 may include the plurality of dielectric substrates 142 and the plurality of antenna elements 143 as in Embodiment 5. Similarly, in this case, the adverse effects caused by the diffracted waves on the reception radio waves to be received by the receiving antenna unit 13 is suppressed within a predetermined range, the isolation between the transmitting antenna unit 12 and the receiving antenna unit 13 can be improved, and the performance degradation of the antenna device 1 can be suppressed.

In all of Embodiments described above, the antenna elements included in the transmitting antenna unit 12 and the receiving antenna unit 13 are described as the patch conductors functioning as a patch antenna. However, the antenna elements included in the transmitting antenna unit 12 and the receiving antenna unit 13 may be configured with helical antenna elements or spiral antenna elements instead of the patch antenna elements, as long as they are capable of transmitting and receiving the radio waves.

In all of Embodiments described above, in order to increase the action of inductance components and capacitance components, the polarized wave conversion plate 15 may be configured with a grid line polarizer made of a multilayer substrate composed of a plurality of stacked single layer printed circuit boards.

Furthermore, the shape of the conductor pattern 151 of the polarized wave conversion plate 15 is not limited to the shape shown in Embodiments above, but can be configured to have the capability to perform a desired polarization conversion. For example, depending on constraints such as manufacturing conditions, a configuration using a C-type element shape, a dipole element shape, or a meander line shape that has wider bandwidth characteristics is possible.

The shield wall 14 is described for the case of a configuration in which the cross-sectional shape, in its X-Z plane, is a rectangle. Not limited to this, however, the shield wall 14 may be configured such that its cross-sectional shape is triangular or trapezoidal.

DESCRIPTION OF SYMBOLS

1 . . . antenna device,
11 . . . base plate,
12 . . . transmitting antenna unit,
13 . . . receiving antenna unit,
14 . . . shield wall,
15 . . . polarized wave conversion plate,
121 . . . dielectric substrate,
122 . . . patch conductor,
123 . . . vertically polarized wave transmission feeding point,
124 . . . horizontally polarized wave transmission feeding point,
125 . . . transmitter unit,
131 . . . dielectric substrate,
132 . . . patch conductor,
133 . . . vertically polarized wave reception feeding point,
134 . . . horizontally polarized wave reception feeding point,
135 . . . receiver unit,
140 . . . shield wall substrate,
141 . . . choke groove,
142 . . . dielectric substrate,
143 . . . antenna element,
151 . . . conductor pattern,
161 . . . circularly polarized waves,
171 . . . vertically polarized waves,
181 . . . circularly polarized waves,
201 . . . circularly polarized waves,
202 . . . horizontally polarized waves,
203 . . . horizontally polarized waves.
204 . . . horizontally polarized waves.
205 . . . diffracted waves

The invention claimed is:

1. An antenna device comprising:

a transmitting antenna unit to transmit transmission radio waves of circular polarization;

a receiving antenna unit to receive reception radio waves of circular polarization;

a shield wall disposed between the transmitting antenna unit and the receiving antenna unit to block the transmission radio waves transmitted from the transmitting antenna unit toward the receiving antenna unit; and a polarized wave converter unit disposed between the shield wall and the receiving antenna unit to convert, among the transmission radio waves, vertically polarized wave components having a polarized wave plane orthogonal to the shield wall into circularly polarized waves having a rotation direction different from that of the reception radio waves to be received by the receiving antenna unit.

2. The antenna device according to claim 1, wherein the transmitting antenna unit and the receiving antenna unit each include a plurality of antenna elements, and the polarized wave converter unit is configured such that a sum of amounts of the transmission radio waves transmitted from the plurality of antenna elements included in the transmitting antenna unit leaking into the plurality of antenna elements included in the receiving antenna unit is below a predetermined value.

3. The antenna device according to claim 2, wherein choke grooves extending in a direction orthogonal to a direction in which the transmitting antenna unit and the receiving antenna unit are arranged and having a depth corresponding to ¼ of a wavelength of the transmission radio waves are provided on a surface of the shield wall.

4. The antenna device according to claim 2, wherein the shield wall comprises a dielectric substrate and antenna elements supported by the dielectric substrate to receive the transmission radio waves.

5. The antenna device according to claim 1, wherein choke grooves extending in a direction orthogonal to a direction in which the transmitting antenna unit and the receiving antenna unit are arranged and having a depth corresponding to ¼ of a wavelength of the transmission radio waves are provided on a surface of the shield wall.

6. The antenna device according to claim 1, wherein the shield wall comprises a dielectric substrate and antenna elements supported by the dielectric substrate to receive the transmission radio waves.

7. An antenna device comprising:

a transmitting antenna unit to transmit transmission radio waves of circular polarization;

a receiving antenna unit to receive reception radio waves of circular polarization;

a shield wall disposed between the transmitting antenna unit and the receiving antenna unit to block the transmission radio waves transmitted from the transmitting antenna unit toward the receiving antenna unit; and a polarized wave converter unit disposed between the transmitting antenna unit and the shield wall to convert circularly polarized waves of the transmission radio waves into horizontally polarized waves having a polarized wave plane parallel to the shield wall.

8. The antenna device according to claim 7, wherein the transmitting antenna unit and the receiving antenna unit each include a plurality of antenna elements, and the polarized wave converter unit is configured such that a sum of amounts of the transmission radio waves transmitted from the plurality of antenna elements included in the transmitting antenna unit leaking into the plurality of antenna elements included in the receiving antenna unit is below a predetermined value.

9. The antenna device according to claim 8, wherein choke grooves extending in a direction orthogonal to a direction in which the transmitting antenna unit and the receiving antenna unit are arranged and having a depth corresponding to ¼ of a wavelength of the transmission radio waves are provided on a surface of the shield wall.

10. The antenna device according to claim 8, wherein the shield wall comprises a dielectric substrate and antenna elements supported by the dielectric substrate to receive the transmission radio waves.

11. The antenna device according to claim 7, wherein choke grooves extending in a direction orthogonal to a direction in which the transmitting antenna unit and the receiving antenna unit are arranged and having a depth corresponding to ¼ of a wavelength of the transmission radio waves are provided on a surface of the shield wall.

12. The antenna device according to claim 7, wherein the shield wall comprises a dielectric substrate and antenna elements supported by the dielectric substrate to receive the transmission radio waves.

13. The antenna device according to claim 7, wherein the transmitting antenna unit and the receiving antenna unit each include a plurality of antenna elements, and the polarized wave converter unit is configured such that a sum of amounts of the transmission radio waves transmitted from the plurality of antenna elements included in the transmitting antenna unit leaking into the plurality of antenna elements included in the receiving antenna unit is below a predetermined value.

* * * * *